United States Patent
Trouve et al.

(10) Patent No.: US 6,471,880 B1
(45) Date of Patent: Oct. 29, 2002

(54) PROCESS FOR CHEMICAL ROUGHENING OF GLASS COMPRISING RINSING WITH SALT SOLUTION AND ARTICLE OBTAINED THEREBY

(75) Inventors: Gérard Trouve; Yves Bessoles, both of Castres (FR)

(73) Assignee: Societe D'Exploitation de produits Pour les Industries Chimiques Seppic, Paris Cedex (FR)

( * ) Notice: Subject to any disclaimer, the term of this patent is extended or adjusted under 35 U.S.C. 154(b) by 20 days.

(21) Appl. No.: 09/590,017

(22) Filed: Jun. 9, 2000

(30) Foreign Application Priority Data

May 31, 2000 (FR) .............................. 00 07015

(51) Int. Cl.$^7$ .............................. C03C 15/02
(52) U.S. Cl. .............................. 216/31; 216/97; 65/472; 65/473
(58) Field of Search .............................. 216/31, 97, 98; 65/472, 473

(56) References Cited

U.S. PATENT DOCUMENTS

| | | | | |
|---|---|---|---|---|
| 3,616,098 A | * | 10/1971 | Falls | 216/91 |
| 4,055,458 A | | 10/1977 | Niederprüm et al. | |
| 4,273,826 A | * | 6/1981 | McCollister et al. | 359/652 |
| 4,781,792 A | | 11/1988 | Hogan | |
| 5,281,350 A | | 1/1994 | Gimm et al. | |
| 5,391,421 A | * | 2/1995 | Gulla | 428/209 |
| 5,415,731 A | | 5/1995 | Kim | |
| 5,425,873 A | * | 6/1995 | Bladon et al. | 205/126 |
| 6,042,739 A | * | 3/2000 | Itoh | 216/88 |

FOREIGN PATENT DOCUMENTS

| | | |
|---|---|---|
| DE | 0153 360 | 1/1982 |
| DE | 224 258 | 7/1985 |
| FR | 2 320 275 | 3/1977 |
| GB | 0 055 792 | 3/1981 |
| GB | 2 055 792 A | 3/1981 |
| RU | 1047855 A | 10/1983 |

OTHER PUBLICATIONS

Patent Abstracts of Japan, vol. 1996, No. 04, Apr. 30, 1996 & JP 07 334841 A (Fuji Electric Co. Ltd.), Dec. 22, 1995.
Database WPI, Section Ch, Week 198332, Derwent Publications Ltd., London, GB, Class L01, AN 1983–733140, XP002145621 & SU 962 233 A (Kondakova L.V.), Sep. 30, 1982.
Search Report issued in French Application No. 580810.

* cited by examiner

*Primary Examiner*—Randy Gulakowski
*Assistant Examiner*—Jiri Smetana
(74) *Attorney, Agent, or Firm*—Burns, Doane, Swecker & Mathis, L.L.P.

(57) ABSTRACT

Provided is a process for etching glass objects by chemical treatment. The process includes (a) at least one stage of chemical treatment of the object, and (b) at least one stage of rinsing the objects etched by the treatment of step (a) with an aqueous solution of one or more alkali metal or alkaline earth metal cation salts.

27 Claims, No Drawings

PROCESS FOR CHEMICAL ROUGHENING OF GLASS COMPRISING RINSING WITH SALT SOLUTION AND ARTICLE OBTAINED THEREBY

BACKGROUND OF THE INVENTION

1. Field of the Invention

The invention relates to a novel process for the chemical etching of glass.

2. Description of the Related Art

The term "etching of a glass slide" refers to the action of rendering it translucent, without being transparent, by rendering one of its surfaces opaque. The result of this action is an extensive roughness with a depth of a few microns, which roughness, according to its height, results in different macroscopic appearances of the surface thus treated. The terms "sparkling etched glass", "matt etched glass", "opaque glass" or "translucent glass" are then used.

Etching is generally carried out by sanding the surface, when it is large in size, by depositing a thin layer or by chemical attack. The latter process is more particularly employed on small surfaces or on objects with more or less complicated shapes. Chemical attack is often carried out using fluoride ions, the latter reacting with the silicon ions of the glass. The glass object is immersed, for a few seconds to a few minutes, either in a bath of concentrated hydrofluoric acid or in an acid bath comprising an initiator for fluoride ions, such as ammonium bifluoride. The glass is subsequently rinsed with water.

Examples of known compositions for etching glass include that disclosed in the German patent published under the number 1,596,961, which comprises hydrofluoric acid, ammonium hydrogen fluoride, subsequently known as ammonium bifluoride, and water, that disclosed in the British patent published under the number 1,276,550, comprising hydrofluoric acid, a water-soluble fluoride, such as ammonium bifluoride, and one or more aliphatic carboxylic acids comprising from one to three carbon atoms which are substituted or unsubstituted by radicals comprising one or more halogen atoms and/or one or more hydroxyl or amino groups, such as, for example, formic acid, acetic acid, propionic acid, monochloroacetic acid, trichloroacetic acid or glycolic acid, or the composition disclosed in the Soviet patent published under the number SU 1,675,244, comprising hydrofluoric acid, ammonium bifluoride, sodium fluorosilicate, potassium fluorosilicate and water. The combination of ammonium bifluoride and hydrofluoric acid makes it possible to improve both the efficiency of the chemical attack and the appearance of the etched glass obtained. On the other hand, it also induces the formation of ammonia, which, in order to meet European discharge standards, necessitates an additional treatment of the industrial effluents, which is expensive and difficult to carry out. The limits set by these standards vary from one river to another. However, it is accepted that a level of ammonia of less than or equal to 1 mg/dm$^3$ constitutes an acceptable average value. In point of fact, it has already been shown that the discharge of acid etching baths results in local concentrations of ammonia in a river of up to 3 to 5 times the maximum standard allowed.

Attempts have naturally been made, in order to overcome this disadvantage, to replace the ammonium bifluoride with sodium bifluoride or potassium bifluoride. Examples of compositions without ammonium salt include that disclosed in the Japanese patent application published under the number 334,841/1995, which comprises hydrofluoric acid, potassium bifluoride and water, or that disclosed in the Brazilian patent application published under the number 85 01205, which comprises hydrofluoric acid, potassium bifluoride, sodium fluoride, oxalic acid, glycerol and baryta. However, these etching compositions are prepared with hydrofluoric acid.

In point of fact, hydrofluoric acid is dangerous to store and handle and it is relatively expensive. For these reasons, etching products are marketed which comprise hydrochloric acid instead of hydrofluoric acid. However, these formulations also comprise ammonium bifluoride.

In the French patent application filed on Dec. 16, 1999 and registered under the number 99 15,887, the Applicant Company has disclosed and claimed a composition, characterized in that it comprises:

(a)—from 20% to 99% by weight of potassium bifluoride, (b)—from 1% to 80% by weight of at least one water-soluble polyvalent cation salt, and optionally one or more of the following compounds:

(c)—up to 15% by weight of ammonium bifluoride, (d)—sodium bifluoride in a proportion by weight of less than or equal to that of potassium bifluoride, it being understood that, when it comprises both ammonium bifluoride and sodium bifluoride, the total amount of these two bifluorides never exceeds that of potassium bifluoride, (e)—from 5% to 60% by weight and more particularly from 10% to 30% by weight of at least one water-insoluble filler chosen from inorganic or organic products which are stable in an acidic medium, for example baryta or barium sulphate, gypsum, insoluble fluorides, such as calcium fluoride, insoluble fluorosilicates, such as sodium fluorosilicate or calcium fluorosilicate, calcium phosphate, calcium sulphate, inorganic oxides, in particular iron, zinc or titanium oxides, sugars and their polymers, such as cellulose or its derivatives, lignin or starch, high molecular weight ethylene oxide polymers, propylene oxide polymers or butylene oxide polymers, fatty acids and their derivatives which are solid at room temperature or insoluble high molecular weight polymers and resins, and/or (f)—from 0.2% to 6% by weight and more particularly from 1% to 2% by weight of one or more surface-active agents which are stable in an acidic medium, such as, for example, alkoxylated fatty alcohols, phosphate-comprising fatty alcohols, phosphate-comprising alkoxylated fatty alcohols, ethylene and propylene oxide copolymers, fatty amides or cationic surface-active agents or the fluorinated derivatives of the said surface-active agents, silicone-comprising or fluorosilicone-comprising surface-active agents.

This composition can more particularly comprise:

from 1% to 60% by weight, in particular from 5% to 30% by weight and more specifically from 10% to 25% by weight of at least one water-soluble polyvalent cation salt. The water-soluble polyvalent cation salt is generally a divalent cation salt or a trivalent cation salt and is more particularly a calcium salt, a magnesium salt, a zinc salt, an iron salt or an aluminium salt, such as, for example, manganese chloride, magnesium chloride, magnesium sulphate, calcium chloride, ferric chloride, alumina or a mixture of these compounds, and/or from 40% to 80% by weight of potassium bifluoride.

This composition is generally provided in the form of a mixture of powders, in the form of granules, in the form of pellets or in the form of pebbles.

In this same French patent application, filed on Dec. 16, 1999 and recorded under the number 99 15,887, the Applicant Company has also disclosed and claimed:

a glass etching solution, characterized in that it is capable of being obtained by mixing between 0.1 kg and 5 kg and preferably between 0.5 kg and 5 kg of the composition as defined above per liter of water or per liter of an aqueous solution of one or more inorganic or organic acids, it being understood that the inorganic acid optionally present in the said aqueous solution before mixing with the said composition is not hydrofluoric acid, and a glass etching solution, characterized in that it is capable of being obtained by mixing, simultaneously or successively, from 0.1 kg to 4.95 kg of potassium bifluoride and from 0.005 kg to 4 kg of at least one water-soluble polyvalent cation salt per liter of water or per liter of an aqueous solution of one or more inorganic or organic acids, it being understood that the inorganic acid optionally present in the said aqueous solution before mixing with the said bifluoride and the said cation salt is not hydrofluoric acid. The latter solution is obtained while optionally also adding sodium bifluoride in an amount per liter of water or of acidic solution of less than or equal to that of the potassium bifluoride or up to 0.75 kg and preferably at most 0.25 kg of ammonium bifluoride or of sodium bifluoride and of ammonium bifluoride, it being understood that the total amount of these two bifluorides is less than or equal to the amount of potassium bifluoride and that the amount of ammonium bifluoride added per liter of water or per liter of acidic solution is less than or equal to 0.75 kg and preferably at most 0.25 kg, and/or while also optionally adding from 0.025 kg to 3 kg and more particularly from 0.05 kg to 1.5 kg of at least one water-insoluble filler, such as that described hereinabove, and/or while also optionally adding from $10^{-3}$ kg to 0.3 kg and preferably from $5\times10^{-3}$ kg to 0.1 kg of one or more surface-active agents which are stable in an acidic medium, such as those described hereinabove.

According to a specific aspect of this etching solution, the proportion of water-soluble polyvalent cation salt mixed is from 0.005 kg to 3 kg, more particularly from 0.025 kg to 1.5 kg and very particularly from 0.05 kg to 1.25 kg per liter of water or per liter of acidic aqueous solution. The water-soluble polyvalent cation salt or salts used are the same as those described for the dry composition.

According to another specific aspect of these two etching solutions, the proportion of potassium bifluoride salt mixed is from 0.2 kg to 4 kg per liter of water or per liter of acidic aqueous solution.

The aqueous solution of one or more inorganic or organic acids acting as base for the two etching solutions described hereinabove is chosen from aqueous hydrochloric acid, sulphuric acid, phosphoric acid, nitric acid, fluorosulphonic acid, citric acid, tartaric acid, oxalic acid, acetic acid, propionic acid or succinic acid solutions or one of their mixtures. It is preferably an aqueous hydrochloric acid solution.

These etching solutions can be in the form of a non-flowing paste, in which case they also comprise one or more thickening agents or binders which are stable to acids.

In the same French patent application filed on Dec. 16, 1999 and registered under the number 99 15,887, the Applicant Company has also disclosed and claimed:

a glass etching process, characterized in that the surface of the glass object is brought into contact for approximately 0.5 second to approximately 300 seconds with a etching solution as defined above and then the object is rinsed and then dried.

According to an alternative form of this process, the sequence of bringing into contact and then of rinsing is repeated several times, more particularly 2 to 4 times.

In point of fact, the Applicant Company has found that the rinsing with water, whether it is acidic or basic, of the object which has been subjected to the chemical treatment with the etching solutions described hereinabove is not sufficient to remove the thin potassium fluorosilicate film attached to the surface of the said object.

SUMMARY OF THE INVENTION

In accordance with the invention, provided is a process for etching glass objects by chemical treatment. The process comprises:

(a) at least one stage of etching by chemical treatment of the glass objects, and (b) at least one stage of rinsing the etched objects of stage (a) with an aqueous solution of one or more alkali metal or alkaline earth metal cation salts.

The objects and aspects of the present invention will become apparent to one of ordinary skill in the art on a review of the specification and claims appended hereto.

DETAILED DESCRIPTION OF PREFERRED EMBODIMENT OF THE INVENTION

A subject-matter of the invention is a process for etching glass objects by chemical treatment, characterized in that it comprises:

(a) at least one stage of chemical treatment of the glass object to be etched;

(b) and at least one stage of rinsing the glass object etched by the said treatment of stage (a) with an aqueous solution of one or more alkali metal or alkaline earth metal cation salts.

Stage (a) is carried out by bringing the object to be etched into contact with an etching solution for a period of time which depends on the nature of the etching solution, on the surface effect which it is desired to obtain and on the composition of the glass to be etched.

Generally, when the etching solution is based on potassium bifluoride and when contact is achieved by immersion of the object in the solution, the duration of the contact is between 0.5 second and 300 seconds.

Depending on their size, the process as defined above is carried out in order to etch one or more objects.

Stage (b) is carried out by immersion of the object to be rinsed in the saline solution for approximately 0.5 second to 300 seconds. If necessary, the solution is stirred during the rinsing.

A more particular subject-matter of the invention is a process as defined above in which the aqueous solution of one or more alkali metal or alkaline earth metal cation salts employed in stage (b) is chosen from aqueous sodium salt, lithium salt, calcium salt or magnesium salt solutions or from the aqueous solutions of a mixture of these salts and very particularly from aqueous sodium chloride, magnesium chloride, calcium chloride or magnesium sulphate solutions or from the aqueous solutions of a mixture of these salts.

The concentration of alkali metal or alkaline earth metal cation salts which are present in the aqueous solution employed in stage (b) is generally less than 20% by weight and it is preferably between 5% and 10% by weight.

According to a specific form of the process as defined above, the aqueous solution of one or more alkali metal or alkaline earth metal cation salts employed in stage (b) is a 10% by weight sodium chloride solution.

The aqueous solution of one or more alkali metal or alkaline earth metal cation salts employed in stage (b) can also comprise one or more surface-active agents chosen from alkoxylated fatty alcohols, phosphate-comprising fatty alcohols, phosphate-comprising alkoxylated fatty alcohols, ethylene and propylene oxide copolymers, fatty amides or cationic surface-active agents or the fluorinated derivatives of the said surface-active agents, silicone-comprising or fluorosilicone-comprising surface-active agents. In this case, the concentration of surface-active agents which are present in the aqueous solution employed in stage (b) is generally less than 20% by weight and is preferably between 0.5% and 5% by weight. It is preferable to employ anionic or cationic surface-active agents in the saline solution, such as, for example, lauryldimethylbenzylammonium bromide, sold under the name Amonyl™ BR1244, or dioctyl sulphosuccinate, sold under the name Supermontaline™ SLT 70.

According to a first alternative form of the process as defined above, the object which has been subjected to the treatment of stage (a) is subjected, during a stage ($b_0$), to rinsing with water, before being subjected to the treatment of stage (b).

Stage ($b_0$) is carried out by immersion of the object to be rinsed in water and, if necessary, stirring the dipping bath or by spraying water over the object.

The water employed in stage ($b_0$) can also comprise between 0.5% and 5% by weight of one or more surface-active agents chosen from alkoxylated fatty alcohols, phosphate-comprising fatty alcohols, phosphate-comprising alkoxylated fatty alcohols, ethylene and propylene oxide copolymers, fatty amides or cationic surface-active agents or the fluorinated derivatives of the said surface-active agents, silicone-comprising or fluorosilicone-comprising surface-active agents. It is preferable to employ anionic or cationic surface-active agents, such as, for example, lauryldimethylbenzylammonium bromide, sold under the name Amonyl™ BR1244, or dioctyl sulphosuccinate, sold under the name Supermontaline™ SLT 70.

The process or its alternative form as defined hereinabove can comprise a stage ($b_1$) in which the object which has been subjected to stage (b) is rinsed with water. This stage ($b_1$) can be followed, if necessary, by a stage ($b_2$) of rinsing with demineralized water. If necessary or if desired, the stage (b) or the sequences of stages ($b_0$) and then (b), (b) and then ($b_1$), ($b_0$), then (b) and then ($b_1$), (b), then ($b_1$) and then ($b_2$) or ($b_0$), then (b), then ($b_1$) and then ($b_2$) are repeated several times, more particularly 2 to 4 times.

In the process and its alternative form as described above, the objects can be drained for a few seconds on conclusion of a given stage before being subjected to the following stage, in order to improve the effectiveness of the said following stage.

According to a specific form of the process and of its alternative form as defined above, the glass objects which have been subjected to the treatment of stage (a) are drained for approximately from 10 to 60 seconds before being subjected to the first of the rinsing stages ($b_0$) or (b). This draining stage then makes it possible to recover a non-zero amount of etching solution, which can optionally be reused.

According to another specific form of the process and of its alternative form as defined above, the sequence (a) and then (b), (a), then ($b_0$) and then (b), (a), then (b) and then ($b_1$), (a), then ($b_0$), then (b) and then ($b_1$), (a), then (b), then ($b_1$) and then ($b_2$) or (a), then ($b_0$), then (b), then ($b_1$) and then ($b_2$), optionally including a draining stage inserted between one or more of the said stages (a), ($b_0$), (b), ($b_1$) and/or ($b_2$), is repeated several times, more particularly 2 to 4 times.

An example of a etching solution appropriate for carrying out stage (a) is the aqueous solutions disclosed in the French patent application filed on Dec. 16, 1999 and registered under the number 99 15,887, the description of which forms an integral part of the present patent application.

These solutions are described hereinabove, in the paragraph setting out the state of the art.

The process as defined hereinabove is particularly appropriate for the etching of small glass objects, such as perfume bottles, liqueur bottles or bottles of wine or alcohol.

According to a final aspect of the present invention, a subject-matter of the latter is etched glass objects, characterized in that they are etched by the process as defined above.

The following examples illustrate the invention without, however, limiting it.

A) DETERMINATION OF THE PARAMETERS a) The Proportion Of Surface Area Etched

The etching capacity of an etching bath can be characterized by the percentage of surface area etched and by the morphology of the features obtained when glass slides are immersed therein for a predetermined period of time, generally of the order of one minute.

b) The Opaqueness

The intensity of the opaqueness effect obtained is characterized for a glass etched over 100% of its surface area. According to the acid etching baths used, hazy, translucent or opaque etchings are obtained. In order to quantify this opaqueness, a etched glass slide is placed above a typographical character of the "Arial 14" font printed on a transparency placed over a light table. The typographical character is observed through a magnifying glass. The glass slide is gradually moved away from the typographical character and the distance "d" beyond which this character is no longer distinguishable is thus determined. The shorter the distance "d", the more opaque the glass. A completely opaque glass results in a value of "d" equal to 0. An unetched transparent glass results in an infinite value of "d".

B) TEST NO. 1 a) Acid Etching with Ammonium Bifluoride

An optical microscope glass slide is immersed for one minute in a saturated solution of ammonium bifluoride in 32% aqueous hydrochloric acid. After rinsing with water and drying, the proportion of surface area etched is evaluated, the height of the features is estimated by microscopic observation and the "d" is measured. An opaque etched glass is obtained which is characterized by a low value of "d" and which has, at the surface, high "features" of uniform distribution.

b) Acid Etching with Sodium Bifluoride

By proceeding in the way as in paragraph a), with a saturated solution of sodium bifluoride in 32% hydrochloric acid, an incompletely etched and heterogeneous glass is obtained. The test is repeated in 32% sulphuric acid and hydrofluoric acid solutions but also leads to unsatisfactory results.

c) Acid Etching with Potassium Bifluoride

By proceeding in the way as in paragraph a), with a saturated solution of potassium bifluoride in 32% aqueous hydrochloric acid, a completely and homogeneously etched glass is obtained which has low "features" and which does not result in any opaqueness (high value of "d"). The etching has an unsightly and "glazed" appearance.

d) Acid Etching with Mixtures Of Potassium Bifluoride And Ammonium Bifluoride

By proceeding in the way as in paragraph a), with a solution saturated with a mixture of potassium and ammonium bifluorides in concentrated hydrochloric acid, somewhat translucent etched glasses are obtained, the opaqueness of which does not increase steadily with the concentration of ammonium bifluoride.

The results of Tests 1a) to 1d) are collated in the following table:

TABLE 1

| Bifluorides employed | Acidic aqueous solution | Surface area etched (in %) | Height of the features (in $\mu$m) maxi/mini | "d" (in mm) |
|---|---|---|---|---|
| $NH_4HF_2$ | 32% HCl | 100 | 40/2 | 9 |
| $NaHF_2$ | 32% HCl | 9 | 5/0.5 | nd |
| $NaHF_2$ | 32% HF | 10 | 13/0.5 | nd |
| $NaHF_2$ | 32% $H_2SO_4$ | 50 | 15/2 | nd |
| $KHF_2$ | 32% HCl | 100 | 5/1 | >130 |
| $KHF_2 + NH_4HF_2$ 50%/50% | 32% HCl | 100 | 40/2 | >130 |
| $KHF_2 + NH_4HF_2$ 70%/30% | 32% HCl | 100 | 40/2 | 24 |
| $KHF_2 + NH_4HF_2$ 85%/15% | 32% HCl | 100 | 40/2 | 24 |

This test shows that the replacement of one bifluoride with another results in unforeseeable results.

C) TEST NO. 2

By proceeding in the way as in paragraph B a), with various saturated solutions of potassium bifluoride in 32% hydrochloric acid comprising various salts, the results collated in the following table are obtained;

TABLE 2

| Salt | Concentration of the salt (% by weight) | Height of the features (in $\mu$m) maxi/mini | d (in mm) |
|---|---|---|---|
| None | 0 | 15/2.5 | >130 |
| NaCl | 1 | 18/2.5 | >130 |
| NaCl | 5 | 15/2.5 | >130 |
| $Na_2SO_4$ | 1 to 5 | 15/2.5 | >130 |
| $Na_2SO_4$ | 10 | 10/2.5 | >130 |
| KCl | 1 | 22/2.5 | >130 |
| KCl | 5 | 22/2.5 | >130 |
| $K_2SiF_8$ | 1 | 22/2.5 | >130 |
| $K_2SiF_6$ | 5 | 22/2.5 | >130 |
| $K_2SO_4$ | 5 | 22/2.5 | >130 |
| LiCl | 1 | 22/2.5 | >130 |
| $MnCl_2$ | 5 | 38/5 | 130 |
| $CaCl_2$ | 5 | 30/5 | 130 |
| $CaCl_2$ | 20 | 38/5 | 12 |
| $MgCl_2$ | 5 | 30/8 | 50 |
| $MgCl_2$ | 10 | 50/8 | 20 |
| $MgCl_2$ | 20 | 60/8 | 14 |

TABLE 2-continued

| Salt | Concentration of the salt (% by weight) | Height of the features (in $\mu$m) maxi/mini | d (in mm) |
|---|---|---|---|
| $FeCl_3$ | 1 | 38/2.5 | 130 |
| $FeCl_3$ | 3 | 25/5 | 70 |
| $FeCl_3$ | 5 | 13/2.5 | 65 |
| $FeCl_3$ | 10 | 5/2.5 | 65 |
| $Al_2O_3$ | 5 | 35/5 | 35 |

These results reveal that, entirely unexpectedly, the presence of soluble polyvalent cation salts, in particular of soluble divalent or trivalent cation salts, in the acid etching baths results in the formation of higher features and makes it possible to result in etchings with a macroscopic opaqueness and a macroscopic appearance which are very similar to those obtained with solutions of ammonium bifluoride in hydrochloric acid or even with hydrofluoric acid solutions. In contrast, the presence of monovalent cation salts does not give this advantage. Etching baths based on hydrofluoric acid and/or on ammonium bifluoride can thus in particular advantageously be replaced with baths based on hydrochloric acid, on potassium bifluoride and on soluble polyvalent cation salts.

D) COMPOSITION EXAMPLES a) Control Compositions

A first control solution (composition $T_1$) is prepared composed of 100 g of potassium bifluoride in 66 ml of 32% aqueous hydrochloric acid.

A second control composition (composition $T_2$) is prepared composed of 100 g of Lerite™ SX13, which is a commercial composition in the form of a powder sold by the company Seppic and which has ammonium bifluoride as the main component, in 40 ml of 32% hydrochloric acid.

b) Example 1

An ammonium-free composition A is prepared by dispersing 100 g of potassium bifluoride in 66 ml of 32% hydrochloric acid and by adding 10 g of magnesium chloride ($MgCl_2.4.5H_2O$) to the resulting mixture.

An ammonium-free composition B is prepared by dispersing 100 g of potassium bifluoride in 66 ml of 32% hydrochloric acid and by adding 10 g of calcium sulphate to the resulting mixture.

Soda-lime glass slides are dipped in each of these compositions for 1 minute, are allowed to drain for 15 seconds and are rinsed according to the following method:

a first stage of rinsing by immersion for a few seconds in a bath of cold water, a second stage of rinsing by immersion for a few seconds in a 10% by weight aqueous sodium chloride solution, a third stage of rinsing by immersion for a few seconds in a bath of cold water.

The operation is then completed by drying the slides thus etched.

The glass slides etched by the compositions A and B have a homogeneous and opaque etched appearance equivalent to that of the existing control composition $T_2$ and much less translucent than that obtained with the control composition $T_1$ without a divalent cation salt.

c) Example 2

A mixture of powders is prepared comprising 78 g of potassium bifluoride and 22 g of magnesium sulphate. This mixture of powders flows freely and does not cake over time on storage. This mixture is dispersed in 51 ml of 32% hydrochloric acid (composition D).

A mixture of powders is prepared comprising 78 g of potassium bifluoride and 22 g of calcium chloride and then this mixture is dispersed in 51 ml of 32% hydrochloric acid (composition E).

Glass slides are etched in each of the compositions D and E as described in Example 1 but replacing, in the second rinsing stage, the 10% by weight aqueous sodium chloride solution with an aqueous solution comprising 5% by weight of sodium chloride and 5% by weight of magnesium sulphate. The glass slides etched by the compositions D and E have a homogeneous opaque etched appearance, similar, in the case of the composition D, to that brought about by the control composition $T_2$ and a little less opaque in the case of the composition E.

d) Example 3

A mixture of powders is prepared comprising 84 g of potassium bifluoride and 16 g of various di- or trivalent cation salts. These mixtures of powders flow freely and do not cake over time on storage. Each of these mixtures is then dispersed in 55 ml of 32% hydrochloric acid. Glass slides are then etched as indicated in Example 1. The glass slides etched by the various compositions have a homogeneous etched appearance and an opaqueness which is markedly improved with respect to those obtained with the salt-free control composition $T_1$.

e) Example 4

A mixture of powders is prepared comprising, by weight, 65% of potassium bifluoride, 20% of magnesium sulphate and 15% of baryta as insoluble inorganic filler. This mixture of powders flows easily and does not cake during storage. It is dispersed in 32% hydrochloric acid in a proportion of 100 kg of powder per 43 liters of acid.

The acid bath thus formed (composition K) is fluid and can be kept stirred without any problems with a conventional stirrer. Its relative density is equal to 1.68.

Glass slides and perfume bottles are etched with this composition according to the protocol described in Example 2. The slides and the bottles exhibit a uniform and very attractive etching with an opaqueness and a sparkle equivalent to those obtained on the same glass objects with the control composition $T_2$. The value d, measured for the glass slides, is equal to 9.

f) Example 5

A mixture of powders is prepared which is identical to that of Example 4, to which is added a fluorinated surface-active agent, Bayowet™ FT 248, sold by the company Bayer, in the proportion of 0.4 kg of surface-active agent per 100 kg of powders. A dry mixture is obtained which flows freely and which is dispersed in 32% hydrochloric acid in the same proportions as those indicated in Example 4. The acid bath obtained (composition L) is very fluid.

Approximately 10 ml of this bath are injected into the bases of electric light bulbs for a time of the order of 3 seconds and then the electric light bulbs are drained. This sequence is resumed a further two times and then the bulbs are rinsed as described in Example 1 and dried. The appearance of the etched bulbs is identical to that of bulbs treated in the same way with a bath of Lerite™ SX 13 (composition $T_2$).

g) Example 6

A mixture of powders is prepared composed of 40% of potassium bifluoride, 25% of sodium bifluoride, 20% of magnesium sulphate, 15% of baryta and 0.5% of Bayowet™ FT 248. This mixture is subsequently dispersed in hydrochloric acid, as in Example 4, and the composition M is thus formed. Perfume bottles are etched as in Example 4. The appearance of the etching is identical to that obtained with the composition L of Example 4 or with the composition $T_2$.

h) Example 7

Compositions Depleted in Ammonium

Mixtures of powders are prepared comprising 65% of a mixture of potassium bifluoride and ammonium bifluoride in various proportions, 20% of magnesium sulphate and 15% of baryta. 1000 g of these compositions are poured into 430 ml of 32% hydrochloric acid and then glass slides are etched as in Example 4. It is noticed that:

the slides etched with the composition N comprising 10% of ammonium bifluoride have a value d of 12 mm, close to that obtained with the composition K which does not comprise ammonium bifluoride, the slides etched with the compositions O or P comprising 20 and 30% of ammonium bifluoride are less opaque.

i) Example 8

Etching in Various Acids

The mixture of powders described in Example 4 is used again. 1000 g of this mixture are poured into 430 ml of various 32% acids in water and then perfume bottles are etched with the acid baths formed. The acids used are hydrochloric acid, sulphuric acid, nitric acid, phosphoric acid, oxalic acid and citric acid.

In all cases, bottles with a uniform etching are obtained. The opaqueness of the bottle etched in the hydrochloric acid bath is equivalent to that of a bottle etched in the composition $T_2$. The bottles etched in the other acids are slightly less opaque and the opaqueness decreases in the order: sulphuric acid, nitric acid, phosphoric acid, citric acid and oxalic acid.

j) Example 9

Etching Processes

The mixture of powders described in Example 4 is used again. 1000 g of this mixture are mixed with 430 ml of a solution comprising water or hydrochloric acid at various concentrations in water. Glass slides are etched according to the protocol of Example 1 and the value d is measured. After a etching cycle, only the baths comprising hydrochloric acid at a concentration of at least 20% result in good opaqueness. A two-cycle etching protocol is subsequently employed: dipping for 15 seconds, draining for 15 seconds, rinsing according to the method described in Example 1 and then drying in the air; then these 4 operations are resumed. Entirely satisfactory etchings are obtained with the mixture of powders according to the invention for all the baths, even that without acid, whereas no satisfactory etching is obtained with this process if the composition Lerite™ SX13 is used.

What is claimed is:

1. Process for etching glass objects by chemical treatment, comprising:

(a) at least one stage of etching by chemical treatment of the glass objects, and (b) at least one stage of rinsing the etched objects of stage (a) with an aqueous solution of one or more alkali metal or alkaline earth metal cation salts, wherein the chemical etching solution employed in stage (a) is obtained by mixing:
between 0.1 kg and 5 kg of a composition comprising:
from 20% to 99% by weight of potassium bifluoride;
from 1% to 80% by weight of at least one water-soluble divalent or trivalent cation salt selected from divalent and trivalent cation salts;
and optionally one or more of the following compounds:
up to 15% by weight of ammonium bifluoride,
sodium bifluoride in a proportion by weight of less than or equal to that of potassium bifluoride, with the proviso that, when the composition comprises both ammonium bifluoride and sodium bifluoride, the total amount of these two bifluorides does not exceed that of potassium bifluoride,
from 5% to 60% by weight of at least one water-insoluble filler chosen from inorganic and organic products which are stable in an acidic medium, or
from 0.2% to 6% by weight of one or more surface-active agents which are stable in an acidic medium;
per liter of water or per liter of an aqueous solution of one or more inorganic or organic acids, with the proviso that the inorganic acid optionally present in the aqueous solution before mixing with the composition is not hydrofluoric acid, preferably per liter of aqueous hydrochloric acid solution.

2. Process according to claim 1, wherein the aqueous solution of one or more alkali metal or alkaline earth metal cation salts is selected from the group consisting of aqueous solutions of sodium salts, lithium salts, calcium salts, magnesium salts and mixtures thereof.

3. Process according to claim 2, wherein the aqueous solution of one or more alkali metal or alkaline earth metal cation salts is selected from the group consisting of aqueous solutions of sodium chloride, magnesium chloride, calcium chloride, magnesium sulphate and mixtures thereof.

4. Process according to claim 1, wherein the concentration of the alkali metal or alkaline earth metal cation salts in the aqueous solution is less than 20% by weight.

5. Process according to claim 1, wherein the aqueous solution of one or more alkali metal or alkaline earth metal cation salts is a 10% by weight sodium chloride solution.

6. Process according to claim 1, wherein the aqueous solution of one or more alkali metal or alkaline earth metal cation salts further comprises one or more surface-active agents selected from the group consisting of alkoxylated fatty alcohols, phosphate-comprising fatty alcohols, phosphate-comprising alkoxylated fatty alcohols, ethylene and propylene oxide copolymers, fatty amides, cationic surface-active agents and fluorinated derivatives thereof, silicone-comprising surface-active agents and fluorosilicone-comprising surface-active agents.

7. Process according to claim 6, wherein the concentration of the one or more surface-active agents in the aqueous solution is less than 20% by weight.

8. Process according to claim 6, wherein the one or more surface-active agents in the aqueous solution are anionic or cationic in nature.

9. Process according to claim 8, wherein the one or more surface-active agents in the aqueous solution are lauryldimethylbenzylammonium bromide or dioctyl sulphosuccinate.

10. Process according to claim 1, wherein stage (b) is repeated from two to four times.

11. Process according to claim 1, further comprising:
a stage ($b_0$) of rinsing the objects with water after stage (a) and before stage (b).

12. Process according to claim 11, wherein the water employed in stage ($b_0$) comprises between 0.5% and 5% by weight of one or more surface-active agents selected from the group consisting of alkoxylated fatty alcohols, phosphate-comprising fatty alcohols, phosphate-comprising alkoxylated fatty alcohols, ethylene and propylene oxide copolymers, fatty amides, cationic surface-active agents and fluorinated derivatives thereof, silicone-comprising surface-active agents and fluorosilicone-comprising surface-active agents.

13. Process according to claim 11, further comprising draining the objects after stage (a) for approximately from 10 to 60 seconds before the rinsing stage ($b_0$).

14. Process according to claim 11, wherein the sequence of stages ($b_0$) and ($b_1$) is repeated from two to four times.

15. Process according to claim 14, wherein the sequence of stages ($b_0$), (b) and ($b_1$) is repeated from two to four times.

16. Process according to claim 11, further comprising:
($b_1$) a stage of rinsing the objects with water after stage (b).

17. Process according to claim 16, further comprising:
($b_2$) a stage of rinsing the objects with demineralized water subsequent to stage ($b_1$).

18. Process according to claim 11, wherein the sequence of stages (a), ($b_0$) and (b), optionally including a draining stage inserted between one or more of the stages, is repeated from two to four times.

19. Process according to claim 1, further comprising:
($b_1$) a stage of rinsing the objects with water after stage (b).

20. Process according to claim 19, further comprising:
($b_2$) a stage of rinsing the objects with demineralized water subsequent to stage ($b_1$).

21. Process according to claim 19, wherein the sequence of stages (a), (b) and ($b_1$), optionally including a draining stage inserted between one or more of the stages, is repeated from two to four times.

22. Process according to claim 1, wherein the sequence of stages (a) and (b), optionally including a draining stage inserted between one or more of the stages, is repeated from two to four times.

23. Process according to claim 1, wherein the proportion of potassium bifluoride salt mixed is from 0.2 kg to 4 kg per liter of water or per liter of acidic aqueous solution.

24. Process according to claim 1, wherein the at least one water-soluble polyvalent cation salt is a salt of calcium, magnesium, zinc, iron, aluminum, manganese, or combinations thereof.

25. Process according to claim 1, wherein the at least one filler is selected from baryta or barium sulphate, gypsum, insoluble fluorides, insoluble fluorosilicates, calcium phosphate, calcium sulphate, inorganic oxides, sugars and their polymers, lignin or starch, high molecular weight ethylene oxide polymers, propylene or latylene oxide polymers, fatty acids and their derivatives which are soluble at room temperature and insoluble high molecular weight polymers and resins.

26. Process according to claim 1, wherein the one or more surface-active agents are selected from alkoxylated fatty alcohols, phosphate-comprising fatty alcohols, phosphate-comprising alkoxylated fatty alcohols, ethylene and propylene oxide copolymers, fatty amides, cationic surface-active agents or fluorinated derivatives of the surface-active agents, and silicone-comprising or fluorosilicone-comprising surface-active agents.

27. Etched glass objects prepared by the process of claim 1.

* * * * *